(12) United States Patent
Theisinger

(10) Patent No.: US 12,407,202 B2
(45) Date of Patent: Sep. 2, 2025

(54) ROTOR OF AN ELECTRIC MACHINE HAVING A MULTI-LAYERED PERMANENT MAGNET ARRANGEMENT

(71) Applicant: Robert Bosch GmbH, Stuttgart (DE)

(72) Inventor: Peter Theisinger, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 18/251,473

(22) PCT Filed: Oct. 25, 2021

(86) PCT No.: PCT/EP2021/079484
§ 371 (c)(1),
(2) Date: May 2, 2023

(87) PCT Pub. No.: WO2022/096300
PCT Pub. Date: May 12, 2022

(65) Prior Publication Data
US 2023/0412020 A1    Dec. 21, 2023

(30) Foreign Application Priority Data
Nov. 9, 2020    (DE) .................... 10 2020 214 035.9

(51) Int. Cl.
*H02K 1/27* (2022.01)
*H02K 1/276* (2022.01)
*H02K 29/03* (2006.01)

(52) U.S. Cl.
CPC ............. *H02K 1/276* (2013.01); *H02K 29/03* (2013.01)

(58) Field of Classification Search
CPC .... H02K 1/276; H02K 29/03; H02K 2213/03; H02K 1/2766
See application file for complete search history.

(56) References Cited

U.S. PATENT DOCUMENTS

2013/0307363 A1    11/2013    Sano et al.
2014/0084732 A1*    3/2014    Hisada ................. H02K 1/27
                                                  310/156.08
(Continued)

FOREIGN PATENT DOCUMENTS

DE    102017209247 A1    12/2018
EP    3308450              4/2018
(Continued)

OTHER PUBLICATIONS

Translation of International Search Report for Application No. PCT/EP2021/079484 dated Feb. 11, 2022 (3 pages).

*Primary Examiner* — Thomas Truong
(74) *Attorney, Agent, or Firm* — Michael Best & Friedrich LLP

(57) ABSTRACT

The present invention relates to a rotor (1) of an electric machine (10), comprising a rotor body (2) which can be rotated about a rotor axis (100), has an outer circumference (8) and a plurality of rotor poles (5) and is formed by a stack of laminations, each rotor pole (5) having a central pole axis (101) and an arrangement of permanent magnets (4) arranged in pockets (6, 7) of the rotor body (2), in particular the stack of laminations, the arrangement of permanent magnets (4) comprising two radially spaced layers (3*i*, 3*a*) having permanent magnets (4), the radially inner layer (3*i*) having two inner pockets (6) arranged symmetrically with respect to the central pole axis (101) and an inner connecting portion (9*i*) between the two inner pockets (6), and the radially outer layer (3*a*) having an outer pocket (7) arranged symmetrically with respect to the central pole axis (101), characterized in that the inner connecting portion (9*i*) is a single connecting portion arranged symmetrically with respect to the central pole axis (101), in that two additional pockets (12) which act as a flow barrier and are arranged symmetrically with respect to the central pole axis (101) are (Continued)

provided between the outer circumference (8) of the rotor body (2) and the outer pocket (7), and in that each additional pocket (12) forms a first outer connecting portion (9*a*) between the additional pocket (12) and the outer pocket (7).

9 Claims, 1 Drawing Sheet

(56) References Cited

U.S. PATENT DOCUMENTS

| 2018/0226848 | A1* | 8/2018 | Kolehmainen | H02K 19/14 |
| 2019/0089216 | A1* | 3/2019 | Sano | H02K 7/006 |
| 2019/0165627 | A1* | 5/2019 | Michaelides | H02K 1/278 |

FOREIGN PATENT DOCUMENTS

| EP | 3651316 A1 | 5/2020 |
| FR | 2973179 B1 | 9/2012 |
| GB | 2551537 A | 12/2017 |

* cited by examiner

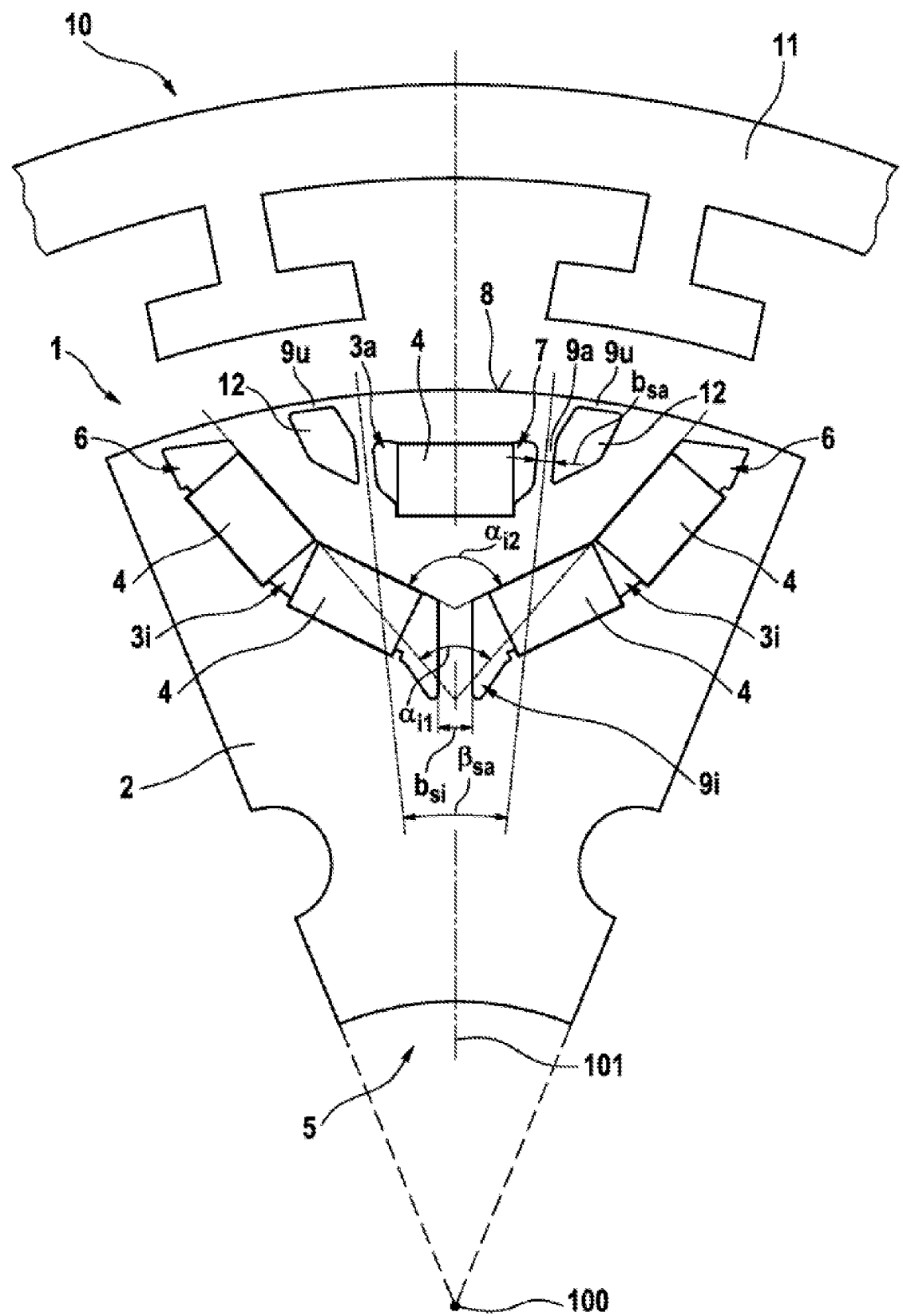

ROTOR OF AN ELECTRIC MACHINE HAVING A MULTI-LAYERED PERMANENT MAGNET ARRANGEMENT

BACKGROUND

The present invention relates to a rotor of an electric machine. In addition, the invention relates to an electric machine having such a rotor. The rotor has a multi-layered arrangement of permanent magnets.

Electric machines are known from the prior art. They often have a rotor in which permanent magnets are provided. These permanent magnets can be provided in different arrangements within the rotor. For example, a multi-layered arrangement of permanent magnets in the manner of a multi-C arrangement with four layers is known from FR 2 973 179 B1. Another similar arrangement is known from US 2013/307363 A1.

SUMMARY

The rotor according to the invention has a multi-layered arrangement of permanent magnets, which enables an increase of the magnetic rotor flux over the prior art. At the same time, the engine-speed strength of the rotor is increased. Furthermore, the rotor enables the reduction of magnetic losses by harmonics, thereby overall increasing the continuous performance of an electric machine.

The multi-layered arrangement of the permanent magnets is in particular not to be realized by only a large number of small permanent magnets but enables the use of larger permanent magnets compared to the prior art. This results in a higher demagnetization strength, as a result of which higher rotor temperatures can be tolerated without the performance of the electric machine being negatively impacted.

The rotor has a rotor body rotatable about a rotor axis. The rotor body is in particular formed by a plurality of individual laminations, which are stacked to form a lamination pack. The individual laminations are in particular manufactured from electrical sheet, particularly preferably die-cut. The rotor body has an outer circumference and a plurality of rotor poles, each rotor pole having a central pole axis and an arrangement of permanent magnets arranged in inner pockets of the rotor body. The pockets are thus preferably formed in the stack of the individual laminations.

The arrangement of permanent magnets comprises two radially spaced layers having permanent magnets, the radially inner layer having two inner pockets arranged symmetrically with respect to the central pole axis and an inner connecting portion provided between the two inner pockets. The radially outer layer has an outer pocket arranged symmetrically with respect to the central pole axis. The radially outer layer thus, particularly advantageously, has such a pocket, which is formed tangentially to the central pole axis. Such an arrangement can in particular significantly reduce critical orders of the torque ripple.

The inner connecting portion is preferably a single connecting portion arranged symmetrically with respect to the central pole axis. The inner connecting portion thus, advantageously, extends along the central pole axis and thus separates the two inner pockets from one another. Two additional pockets acting as flow barriers are provided between the outer circumference of the rotor body and the outer pocket. The additional pockets are likewise arranged symmetrically with respect to the central pole axis. Each additional pocket forms a first outer connecting portion between the additional pocket and the outer pocket. There are thus two first outer connecting portions, between which the outer pocket is located. Such an arrangement of pockets and connecting portions is also hereinafter referred to as a C-minus arrangement. This particularly follows from the fact that the permanent magnets of the radially inner layer are arranged in the shape of a C, while the radially outer layer in particular has the shape of a minus.

The rotor described is in particular suitable for use in electric machines for hybrid vehicles or electric vehicles and can in particular be used in permanently excited synchronous machines. If the rotor is used in such electric machines, high torques and high powers can be achieved, with a simultaneously high engine-speed strength. The arrangement furthermore enables a high demagnetization strength of the permanent magnets used, thereby increasing a rotor limit temperature. This in particular leads to said high continuous performance of the electric machine. Furthermore, the arrangement of the permanent magnets, in particular the arrangement in the radially outer layer, enables a low torque ripple. Further advantages of the said arrangement are low losses, in particular low iron losses and magnetic losses, as well as low material costs and production costs.

Particularly preferably, it is provided that each additional pocket additionally forms a second outer connecting portion between the outer circumference of the rotor body and the additional pocket. The additional pocket is thus bounded by the first outer connecting portion and the second outer connecting portion and thus has a closed cross section at least in the plane perpendicular to the axis of rotation. The additional pocket advantageously remains empty and is thus filled only with ambient air. In this way, the additional pocket acts as a flow barrier, while the second outer connecting portions ensure a high torque strength of the rotor.

In an alternative embodiment not shown, it is preferably provided that the additional pockets are designed to be open toward the outer circumference in the stack of laminations. The second outer connecting portions described above are thus in particular not present. In this case, the additional pockets are advantageously filled with a magnetically non-conductive mass. Due to the magnetically non-conductive mass, a mechanical stability of the rotor is in particular increased, whereby the corresponding additional pocket on the one hand acts as a flow barrier and on the other hand ensures the engine-speed strength of the rotor.

Advantageously, a multitude of permanent magnets are arranged one behind the other in the axial direction in each inner pocket and/or in each outer pocket. The axial dimension of each permanent magnet is thus not necessarily identical to the axial dimension of the rotor body. Rather, in the axial direction, a plurality of permanent magnets can be arranged one behind the other in order to fill the inner pockets and/or outer pockets.

In a further preferred embodiment, it is provided that two permanent magnets of the radially inner layer are respectively arranged symmetrically with respect to the central pole axis and respectively enclose an acute opening angle $\alpha_{i1}$, $\alpha_{i2}$ relative to one another. This means that the permanent magnets assume an angle relative to one another that is less than 180°. The two first outer connecting portions of the radially outer layer enclose an acute connecting-portion angle $\beta_{sa}$ relative to one another. It is preferably provided that the opening angle $\alpha_{i1}$, $\alpha_{i2}$ of each pair of symmetrically arranged permanent magnets of the radially inner layer is greater than the connecting-portion angle $\beta_{sa}$ between the first outer connecting portions. This in particular leads to an optimized magnetic flux within the rotor, which allows high powers of the electric machine using the rotor to be achieved at simultaneously high torque strength.

It is also advantageously provided that the inner connecting portion of each rotor pole has a width $b_{si}$ measured in the circumferential direction of the rotor. The first outer connecting portions of each rotor pole have a width $b_{sa}$ measured in the circumferential direction of the rotor. It is advantageously provided that the width $b_{si}$ of the inner connecting portion is designed to be larger than the width $b_{sa}$ of the first outer connecting portions. An optimum dimensioning of the respective connecting portions thus takes place as a function of the forces to be supported, and stray fluxes can in particular be minimized in a manner optimized for a maximum magnetic rotor flux point.

A single permanent magnet is preferably arranged between the first outer connecting portions of each outer pocket. This applies in particular within the plane perpendicular to the axis of rotation so that it is furthermore possible to stack a plurality of permanent magnets in the axial direction.

Preferably, at least two adjacent permanent magnets are respectively arranged in each of the two inner pockets between the inner connecting portion and the outer circumference of the rotor body. This in turn applies preferably in the plane perpendicular to the axis of rotation so that it is furthermore made possible to axially stack a plurality of permanent magnets. The two permanent magnets per inner pocket are in particular arranged in such a way that they at least partially encompass the permanent magnet in the outer pocket. In particular, the C-minus arrangement described above is thus achieved in a simple manner.

Preferably, the two inner pockets are each designed to be bent in such a way that the permanent magnets of each inner pocket have different angles relative to the central pole axis. In particular, the above-described C-shape is realized in this way. The arrangement of the permanent magnets and the assembly of the rotor is thus simplified.

Preferably, the magnets of each rotor pole, in particular the magnets of the entire rotor, have identical dimensions. The provision of the permanent magnets is thus enabled simply and inexpensively. In addition, the assembly of the rotor is simplified since an identical permanent magnet can be used in every position provided for the assembly of magnets.

The invention also relates to an electric machine. The electric machine comprises a rotor as described above. In addition, the electric machine comprises a stator for driving the rotor. The use of the rotor as described above leads in particular to the aforementioned advantageous properties of the electric machine.

BRIEF DESCRIPTION OF THE DRAWING

Exemplary embodiments of the invention are described in detail below with reference to the accompanying drawing. The drawing shows:

FIG. 1 a schematic illustration of an electric machine according to an exemplary embodiment of the invention

DETAILED DESCRIPTION

FIG. 1 schematically shows an electric machine 10 according to an exemplary embodiment of the invention. The electric machine 10 has a stator 11 and a rotor 1. The stator 11 is used to drive the rotor 1. FIG. 1 only shows a single rotor pole 5 of the rotor 1, wherein the remaining arrangement of the rotor 1 and/or stator 11 is preferably symmetrical with respect to the detail shown.

The rotor 1 comprises a rotor body 2, which is designed to be rotatable about an axis of rotation 100. The rotor body 2 is preferably formed from a plurality of stacked laminations. The laminations are, for example, die-cut from electrical sheet.

The rotor body 2 has an outer circumference 8 as well as a plurality of magnet pockets 6, 7. The rotor body 2 also forms a plurality of rotor poles 5, wherein, as described above, only one of these rotor poles 5 is shown in FIG. 1. Said rotor pole 5 in turn has a central pole axis 101, wherein the rotor pole 5 is symmetrical with respect to this central pole axis 101.

Each rotor pole 5 has a multi-layered arrangement of permanent magnets 4, wherein on the one hand, permanent magnets 4 of a radially inner layer $3i$ and permanent magnets 4 of a radially outer layer $3a$ are provided. The radially inner layer $3i$ is arranged spaced apart from the radially outer layer $3a$ in the radial direction. The radially inner layer $3i$ comprises two inner pockets 6 arranged symmetrically with respect to the central pole axis 101. An inner connecting portion $9i$ is provided between the two inner pockets 6. The inner connecting portion $9i$ is a single connecting portion arranged symmetrically with respect to the central pole axis 101.

The radially outer layer $3a$ comprises an outer pocket 7 arranged symmetrically with respect to the central pole axis 101. In addition, it is provided that two additional pockets 12, which act as a flow barrier and are arranged symmetrically with respect to the central pole axis 101, are provided between the outer circumference 8 of the rotor body 2 and the outer pocket 7. A first outer connecting portion $9a$ is respectively arranged between the additional pocket 12 and the outer pocket 7. A second outer connecting portion $9u$ is also respectively provided between each additional pocket 12 and the outer circumference 8 of the rotor body 2. A cross section of the additional pockets 12 is thus designed to be closed, at least with respect to the plane perpendicular to the axis of rotation 100. However, alternative embodiments not shown are also possible, such as, in particular, the embodiment of the additional pockets 12 with an open cross section, in which the additional pockets 12 are designed to be open toward the outer circumference 8. In this case, the additional pockets 12 are advantageously filled with a magnetically non-conductive material in order to increase the mechanical strength. Apart from air, a corresponding filling is not necessary in the embodiment shown in FIG. 1; rather, it is provided here that the additional pocket 12 remains free and is thus only filled with ambient air. In this case, the effect as a flow barrier is achieved simply and inexpensively.

In the outer pocket 7, only one permanent magnet 4 is attached between the two first outer connecting portions $9a$. This relates in particular to the plane perpendicular to the axis of rotation 100, since a plurality of permanent magnets 4 can advantageously be stacked in the axial direction with respect to the axis of rotation 100.

Two permanent magnets 4 are respectively preferably arranged in each inner pocket 6 between the inner connecting portion $9i$ and the outer circumference 8 of the rotor body 2. This also relates in particular to the plane perpendicular to the axis of rotation, since a plurality of permanent magnets 4 can also be stacked here in the axial direction with respect to the axis of rotation 100.

Each inner pocket 6 is preferably designed to be angled so that each permanent magnet 4 of the inner pocket 6 has a different angle relative to the central pole axis 101. Due to the symmetrical embodiment of the two inner pockets 6 of a rotor pole 5 with respect to the central pole axis 101, it is thus achieved that two permanent magnets 4 of each inner pocket 6 are respectively arranged symmetrically with respect to one another. Each of these pairs of symmetrically arranged permanent magnets 4 forms an acute opening angle $\alpha_{i1}$ and $\alpha_{i2}$. In FIG. 1, the radially further inner, symmetrically arranged permanent magnets 4 form the acute opening angle $\alpha_{i2}$, while the two radially further outer permanent magnets 4 of the inner pockets 6 form the acute opening angle $\alpha_{i1}$. The two first outer connecting portions 9*a* of the radially outer layer 3*a* also form an acute angle, the acute connecting-portion angle $\beta_{sa}$.

It is provided that each opening angle $\alpha_{i1}$ and $\alpha_{i2}$ is larger than the connecting-portion angle $\beta_{sa}$. In this way, the magnetic fluxes within the rotor 1 can be optimized in order to maximize a performance of the electric machine 10.

Furthermore, it is provided that the inner connecting portion 9*i* has a width $b_{si}$ measured in the circumferential direction of the rotor 1. The first outer connecting portions 9*a* have a width $b_{sa}$ measured in the circumferential direction of the rotor 1. Here, it is provided that the width $b_{si}$ of the inner connecting portion 9*i* is designed to be larger than the width $b_{sa}$ of the first outer connecting portions 9*a*. The sizes of the corresponding connecting portions 9*i*, 9*a* are thus optimized with regard to existing force ratios, wherein the formation of stray fluxes is minimized.

The above-described embodiment of the radially inner layer 3*i* and the radially outer layer 3*a* enables the permanent magnets 4 to be provided in a C-minus arrangement, wherein this arrangement can be achieved simply and inexpensively. It is thus, in particular, provided that all permanent magnets 4 provided in the rotor pole 5 have identical dimensions. This simplifies the assembly of the rotor 1 since no assignments of permanent magnets 4 to certain positions are to be considered. At the same time, the C-minus arrangement enables optimized rotor flux with increased torque strength. On the one hand, a high torque and a high power are thus enabled. On the other hand, due to the possibility of using larger permanent magnets 4, a demagnetization strength of the permanent magnets 4 and thus a rotor limit temperature are increased. A continuous performance of the electric machine 10 is thus increased. The simple arrangement described above also minimizes production costs and material costs.

The invention claimed is:

1. A rotor (1) of an electric machine (10), comprising a rotor body (2) which can be rotated about a rotor axis (100), has an outer circumference (8) and a plurality of rotor poles (5) and is formed by a stack of laminations, each rotor pole (5) having a central pole axis (101) and an arrangement of permanent magnets (4) arranged in pockets (6, 7) of the rotor body (2), the arrangement of permanent magnets (4) comprising two radially spaced layers (3*i*, 3*a*) having permanent magnets (4), a radially inner layer (3*i*) having two inner pockets (6) arranged symmetrically with respect to the central pole axis (101) and an inner connecting portion (9*i*) between the two inner pockets (6), and a radially outer layer (3*a*) having an outer pocket (7) arranged symmetrically with respect to the central pole axis (101), wherein the inner connecting portion (9*i*) is a single connecting portion arranged symmetrically with respect to the central pole axis (101), two additional pockets (12) which act as a flow barrier and are arranged symmetrically with respect to the central pole axis (101) are provided between the outer circumference (8) of the rotor body (2) and the outer pocket (7), each additional pocket (12) forms a first outer connecting portion (9*a*) between the additional pocket (12) and the outer pocket (7), and each of the two inner pockets (6) arranged symmetrically with respect to the central pole axis (101) contain a radially inner permanent magnet and a radially outer permanent magnet, wherein the radially outer permanent magnets in each of the inner pockets are arranged to form an acute opening angle $\alpha_{i1}$ and the radially inner permanent magnets in each of the inner pockets are arranged to form an acute opening angle $\alpha_{i2}$, and wherein the two first outer connecting portions (9*a*) of the radially outer layer (3*a*) enclose an acute connecting-portion angle $\beta_{sa}$ and the acute opening angles $\alpha_{i1}$, $\alpha_{i2}$ are greater than the acute connecting-portion angle $\beta_{sa}$ between the first outer connecting portions (9*a*).

2. The rotor according to claim 1, wherein each additional pocket (12) additionally forms a second outer connecting portion (9*u*) between the outer circumference (8) of the rotor body (2) and the additional pocket (12).

3. The rotor according to claim 1, wherein the additional pockets (12) are configured to be open toward the outer circumference (8) in the stack of laminations and are filled with a magnetically non-conductive mass.

4. The rotor (1) according to claim 1, wherein the inner connecting portion (9*i*) of each rotor pole (5) has a width $b_{si}$ measured in a circumferential direction of the rotor (1) and the first outer connecting portions (9*a*) of each rotor pole (5) have a width $b_{sa}$ measured in the circumferential direction of the rotor (1), wherein the width $b_{si}$ of the inner connecting portion (9*i*) is designed to be larger than the width $b_{sa}$ of the first outer connecting portions (9*a*).

5. The rotor (1) according to claim 1, wherein a single permanent magnet (4) is arranged between the first outer connecting portions (9*a*) of each outer pocket (7).

6. The rotor (1) according to claim 1, wherein at least two adjacent permanent magnets (4) are respectively arranged between the inner connecting portion (9*i*) and the outer circumference (8) of the rotor body (2) in each of the two inner pockets (6).

7. The rotor (1) according to claim 1, wherein the two inner pockets (6) are each configured to be bent in such a way that the permanent magnets (4) of each inner pocket (6) have different angles relative to the central pole axis (101).

8. The rotor (1) according to claim 1, wherein the permanent magnets (4) of each rotor pole (5) have identical dimensions.

9. An electric machine (10) having a rotor (1) according to claim 1 and a stator (11) for driving the rotor (1).

* * * * *